United States Patent Office 2,816,123
Patented Dec. 10, 1957

2,816,123

CHEMICAL PROCESS

Elmer H. Dobratz, Pittsburgh, Pa., assignor to Koppers Company, Inc., a corporation of Delaware No Drawing. Application July 13, 1955,
Serial No. 521,906

3 Claims. (Cl. 260—437)

This application relates to the preparation of tetraethyllead from aluminum triethyl, lead chloride and ethyl iodide.

This invention is concerned with a new and novel application for the preparation of tetraethyllead. It is further and more particularly concerned with a process for the preparation of tetraethyllead utilizing triethylaluminum, lead chloride and ethyl iodide as reactants.

Heretofore the preparation of tetraethyllead has been accomplished by preparing an alloy of lead and sodium, comminuting the alloy and reacting it with ethyl chloride to form tetraethyllead, free metallic lead and sodium chloride. Only a portion of the lead is converted to tetraethyllead. The unreacted lead is subjected to a purification step and reused in further production of the alloy.

According to the present invention it is possible to produce tetraethyllead in excellent yields utilizing triethylaluminum, lead chloride and ethyl iodide as reactants. Conveniently the process of the invention is carried out by adding lead chloride and ethyl iodide to triethylaluminum contained in a reaction vessel equipped with a stirrer and a reflux condenser while stirring. The ethyl iodide can be added simultaneously with or subsequent to the addition of the lead chloride. It is to be noted that the triethylaluminum is in an inert, protective atmosphere, such as for example, nitrogen.

After the addition of the lead chloride and ethyl iodide is completed the reactants are stirred for approximately 1 hour. Thereafter the various components in the reaction vessel are separated by distillation. Of course, the distillation of excess triethylaluminum and tetraethyllead is accomplished at reduced pressures.

Thus, the process of this invention comprises adding to triethylaluminum while stirring, lead chloride and ethyl iodide, contacting the triethylaluminum, lead chloride, and ethyl iodide at a temperature in the range of at least 50° C. until there is produced lead tetraethyl and aluminum dichloroiodide.

In general there are utilized equimolar amounts of aluminum triethyl, lead chloride and ethyl iodide and there is obtained tetraethyllead and aluminum dichloroiodide. The lead tetraethyl is separated by distillation. Alternatively, and as aforedescribed, the reaction can be run utilizing an excess of aluminum triethyl in which instance the remaining aluminum triethyl and lead tetraethyl are separated by distillation under high vacuum.

As used here the terms "parts" and "percent" mean parts and percent by weight unless otherwise specified.

The following examples are illustrative, but not restrictive, of the present invention.

Example 1

To a stirrer-equipped reaction vessel having a reflux condenser there is added 114 parts triethylaluminum maintained in an atmosphere of nitrogen and the temperature raised to 50° C. while stirring. Stirring is continued and there is added simultaneously, and over a period of about 1 hour, 278 parts lead chloride and 156 parts ethyl iodide. Stirring is continued for an additional two hours after addition of the lead chloride and ethyl iodide is completed. The contents of the reaction vessel are then distilled at approximately 10–20 mm. mercury. There is obtained approximately 270 parts tetraethyllead.

The foregoing example can also be run utilizing inert solvents preferably a hydrocarbon such as, for example, petroleum ether, ligroin, benzene, xylene and the like.

Example 2

The procedure of Example 1 is repeated except that all the lead chloride is added over a period of about 1 hour and then all the ethyl iodide is added immediately thereafter over a period of about 1 hour. Substantially the same yield of tetraethyllead is obtained as in Example 1.

While the invention has been described with reference to particular embodiments thereof, it will be understood that in its broadest aspects the invention may be variously embodied within the scope of the invention as set forth herein and in the appended claims.

What is claimed is:

1. A process for the production of tetraethyllead comprising contacting triethylaluminum with lead chloride and ethyl iodide in an inert atmosphere and allowing said reactants to remain in contact at a temperature of at least 50° C. until there is formed tetraethyllead, and thereafter recovering said tetraethyllead.

2. Process of claim 1 in which the lead chloride and ethyl iodide are contacted simultaneously with the triethylaluminum.

3. Process of claim 1 in which the lead chloride is contacted with the triethylaluminum before the ethyl iodide is added.

No references cited.